(12) United States Patent
Menin

(10) Patent No.: US 7,560,659 B2
(45) Date of Patent: Jul. 14, 2009

(54) ROBOT-AIDED REMOTE LASER WELDING WITH SIMPLIFIED CONTROL OF FOCUSING DIRECTION OF LASER BEAM

(75) Inventor: Roberto Menin, Vico Canavese (IT)

(73) Assignee: Comau, S.p.A., Grugliasco (Turin) (IT)

( * ) Notice: Subject to any disclaimer, the term of this patent is extended or adjusted under 35 U.S.C. 154(b) by 553 days.

(21) Appl. No.: 11/139,938

(22) Filed: May 27, 2005

(65) Prior Publication Data

US 2005/0263499 A1 Dec. 1, 2005

(30) Foreign Application Priority Data

May 28, 2004 (IT) .......................... TO2004A0361

(51) Int. Cl.
*B23K 26/08* (2006.01)
*B23K 26/24* (2006.01)

(52) U.S. Cl. .............................. 219/121.64; 219/121.79

(58) Field of Classification Search ............ 219/121.63, 219/121.64, 121.78, 121.8, 121.79
See application file for complete search history.

(56) References Cited

U.S. PATENT DOCUMENTS

| | | | | |
|---|---|---|---|---|
| 4,418,266 A | * | 11/1983 | Rosenbeck et al. | 219/137 R |
| 4,572,941 A | * | 2/1986 | Sciaky et al. | 219/121.64 |
| 4,578,554 A | * | 3/1986 | Coulter | 219/121.63 |
| 4,650,952 A | * | 3/1987 | Akeel | 219/121.74 |
| 4,798,931 A | * | 1/1989 | Hess, III | 219/121.64 |
| 4,831,316 A | * | 5/1989 | Ishiguro et al. | 700/254 |
| 4,964,362 A | * | 10/1990 | Dominguez | 118/315 |
| 5,249,729 A | * | 10/1993 | Kuwana et al. | 228/125 |
| 5,302,802 A | * | 4/1994 | Fujinaga et al. | 219/121.78 |
| 5,515,599 A | * | 5/1996 | Best | 29/705 |
| 5,611,949 A | * | 3/1997 | Snellman et al. | 219/121.67 |
| 5,665,255 A | | 9/1997 | Busuttil | |
| 5,999,678 A | * | 12/1999 | Murphy-Chutorian et al. | 385/117 |
| 6,384,369 B1 | * | 5/2002 | Stenersen et al. | 219/121.64 |
| 6,600,133 B2 | * | 7/2003 | Watanabe et al. | 219/125.1 |

(Continued)

FOREIGN PATENT DOCUMENTS

EP 0 483 385 A1 5/1991

(Continued)

OTHER PUBLICATIONS

European Search Report dated May 26, 2005 for Application No. EP 05 00 6779.

(Continued)

*Primary Examiner*—Samuel M Heinrich
(74) *Attorney, Agent, or Firm*—Young Basile

(57) ABSTRACT device for remote laser welding of metal sheet structures comprises an anthropomorphous robot onto whose wrist is mounted an accessory device carrying a focusing head for the laser beam coming from a laser source, as well as means for oscillating the pointing direction of the focused laser beam around one oscillation axis. During welding the robot shifts the accessory device along a given trajectory and at a given speed, while the pointing direction of the focused beam is oscillated to as to allow the area of structure that is lighted by the laser beam to shift at a speed and/or along a trajectory not depending directly on the shifting trajectory and speed of the accessory device carried by the robot.

7 Claims, 1 Drawing Sheet

U.S. PATENT DOCUMENTS

| | | | |
|---|---|---|---|
| 6,608,281 B2 * | 8/2003 | Ishide et al. | 219/121.78 |
| 2001/0001516 A1 * | 5/2001 | Hardgrove et al. | 264/400 |
| 2002/0104833 A1 * | 8/2002 | Bradley | 219/121.63 |
| 2004/0245227 A1 * | 12/2004 | Grafton-Reed et al. | 219/121.83 |

FOREIGN PATENT DOCUMENTS

| | | |
|---|---|---|
| EP | 0440001 B1 | 1/1994 |
| EP | 0440002 B1 | 9/1994 |
| EP | 1 270 139 A1 | 5/2002 |
| EP | 1228835 A1 | 8/2002 |
| EP | 1236535 A2 | 9/2002 |
| EP | 1238748 A2 | 9/2002 |
| EP | 1 568 436 A1 | 12/2004 |
| JP | 358047588 A * | 3/1983 |
| JP | 358053384 A * | 3/1983 |
| JP | 58173095 A * | 10/1983 |
| JP | 360027491 A * | 2/1985 |
| JP | 363063594 A * | 3/1988 |
| JP | 363264289 A * | 11/1988 |
| JP | 401115553 A * | 5/1989 |
| JP | 403018494 A * | 1/1991 |
| JP | 404013233 A * | 1/1992 |
| JP | 404084685 A * | 3/1992 |
| JP | 2002224868 A * | 8/2002 |
| JP | 2003305581 A * | 10/2003 |
| WO | 2005/009667 A1 | 2/2005 |

OTHER PUBLICATIONS

System Technology Euro Laser, The Advance Thinkers, pp. 18-21, Germany.

* cited by examiner

ROBOT-AIDED REMOTE LASER WELDING WITH SIMPLIFIED CONTROL OF FOCUSING DIRECTION OF LASER BEAM

BACKGROUND OF THE INVENTION

The present invention refers to methods and devices for robot-aided laser welding, namely for welding metal sheet structures, for instance structures constituting assemblies or subassemblies of motor-vehicle bodies or frames, or structures not related to the automotive field.

Long ago the Applicant proposed (see for instance European patents no. EP 0 440 001 B1 and no. EP 0 440 002 B1 related to the so-called "LASERGATE" system) devices for laser welding of motor-vehicle structures. The use of laser welding for such applications, however, has not spread much straightly after its first proposal at the beginning of the '90s. This is mainly due to the fact that tests made with the first embodiments of laser welding devices have shown the presence of several problems related to such technology.

A first relevant problem is a result of the wide use in the automotive field of metal sheets provided with an outer zinc-plated protection layer. Said layer gives rise to the generation of zinc vapors during laser welding, which often jeopardize a good quality welding.

Such problem has been dealt with and disclosed in detail in European patent applications no. EP 1 238 748 A1 and no. EP 1 236 535 A1 belonging to the same Applicant, which relate to devices that can overcome in a simple and efficient manner the aforesaid technical hindrance, ensuring outlets for zinc vapors generated during the welding process. Another solution to the problem of zinc vapors has also been suggested in the Italian patent application TO2002A000760 belonging to the Applicant.

Some time had to lapse, however, before the aforesaid technical problem was acknowledged, studied and solved completely, which explains at least partly the long period in which the use of laser welding was still in progress in the automotive field.

Another relevant problem to be kept into account in the application of laser welding for assembling motor-vehicle structures is related to the need for a high assembly quality with short manufacturing times. An assembly station for a motor-vehicle body or for a subassembly thereof typically comprises a plurality of locating and blocking systems ensuring the correct position of the metal sheet elements of the structure during welding. There is obviously a minimum threshold for the number of blocking systems that can be arranged to said purposes, below which the structure geometry is not conveniently ensured, thus resulting in a low-quality assembly operation. This gives rise to a relatively "crowded" welding station, full of blocking systems with their control devices for switching them from an open rest condition to a closed operating condition and vice versa. More to the point, in case of flexible welding stations, i.e. stations operating on several types or models or versions of structure to be welded, the welding station is also equipped with guiding and controlling means for several structures supporting the blocking systems, rapidly interchangeable depending on the type of body or subassembly each time getting into the welding station. The subsequent relative complexity of the architecture of the welding station and of its parts obviously complicates the job of handling robots used for bringing welding means (electric welding guns in conventional cases, laser heads for laser welding) close to the various areas of the structure to be welded.

Both in the case of traditional techniques with electric welding guns and of laser welding, robots should successively reach a series of areas of the structure to be welded in order to carry out the welding operations assigned to them. Therefore, after the structure to be welded has reached the welding station, it should stay in said station for a period at least long enough to enable every robot to carry out all the operations assigned to it. Obviously, the period spent in the welding station could be reduced by increasing the number of robots, but here again there is a threshold to this possibility due both to economic reasons and to the fact that beyond a given number of robots, each of them becomes a hindrance to the operation of one or more robots adjacent to it.

On the other hand, the time used by each robot to carry out all the welding operations assigned to it is made up not only of the sum of the times required for the various operations, but also of the time each time used to reach the area to be welded, and such time can be quite long especially when the robot has to follow a relatively winding way, dodging any interference both with parts of the structure to be welded and with the various blocking systems engaged thereon.

On the other hand, it should be considered that at the beginning of the use of laser for welding motor-vehicle structures, available laser generators were relatively less efficient and less powerful than those currently available. With first generation laser generators it was anyway necessary to ensure a relatively close position of the laser head carried by the robot with respect to the structure to be welded, so that from this point of view the use of laser was not particularly advantageous with respect to traditional electric spot welding. With currently available laser systems, conversely, new promising solutions open the way to a dramatic reduction of manufacturing costs.

The idea that underlies said evolution and that has been the object of first tests made by the Application, consists in handling the laser head with a robot, holding it at a given distance from the structure to be welded, and in arranging means enabling to orient the focusing direction of the laser beam, so as to shift the latter along the structure to be welded in a direction and at a speed not depending directly on the direction and speed with which the robot shifts the laser head. This is obviously exploited not only for moving the laser beam with respect to the structure to be welded in a given area, in order to obtain a weld seam, but also and especially for welding rapidly and efficiently various areas of the structure to be welded, during the shift of the head carried by the robot.

A solution related hereto has been proposed by the Applicant in European patent application no. EP 1 228 835 A1 (System and method for remote laser welding), which the Applicant is co-owner of. Said known system, however, applies to a "Cartesian" robot and not to an "anthropomorphous" robot, and it is "added" to and not integrated into the robot.

A similar solution, though implemented with a device "integrated" into the robot structure, has further been the object of the previous Italian patent application TO2003A001017 belonging to the same Applicant, filed on Dec. 18, 2003 and still undisclosed at the date on which the present application has been filed. Said solution, as the one disclosed in European patent application EP 1 228 835 A1 mentioned above, is nevertheless quite complex, especially concerning the device for focusing and orienting the laser beam and its control means.

SUMMARY OF THE INVENTION

The aim of the present invention is to carry out a method and a device for laser welding that can exploit the aforesaid basic idea in a simple and efficient manner, characterized in particular by an extremely simple architecture and operation.

According to the invention, said aim is achieved by the method of claim 1 and/or by a device according to claim 2.

Further advantageous characteristics of the invention are listed in the dependent claims.

The possibility of holding the focusing head at a distance from the piece to be welded enables a high simplification of the trajectory of the head carried by the robot during welding. During the welding step the laser head "flies over" the piece to be welded at a distance, while at the same time the focused laser beam is oriented so as to carry out the weld line in the various areas of the piece.

As a rule, the focusing head can be shifted with respect to the structure to be welded at a speed higher than the speed at which the laser beam should create a weld bead. This means that, when welding every bead, the focusing direction is varied so that the laser beam is still directed to the seam in progress when the head has already gone out of the area where said seam is created. Thus, when the seam is completed, the laser head has already gone farther, and therefore the welding of a new seam can be started by varying abruptly the pointing direction of the laser beam so as to bring the latter straight into the area in which the new weld beam has to be started.

Still according to the invention, said result is achieved with a device having an extremely simple architecture, which is an accessory to be installed onto the wrist of a multi-axis anthropomorphous robot and which has a simplified structure since it has one axis for oscillating the focusing direction of the laser beam. Said result is achieved either arranging a support structure for the focusing head, which is oscillated with respect to a base frame, or arranging optical means (for instance an oscillating mirror) for the oscillation of the focused beam.

BRIEF DESCRIPTION OF THE DRAWINGS

Further characteristics and advantages of the invention will appear from the following description, made with reference to the accompanying drawings, provided by mere way of non-limiting example, in which.

DETAILED DESCRIPTION OF THE INVENTION

Figure 1:
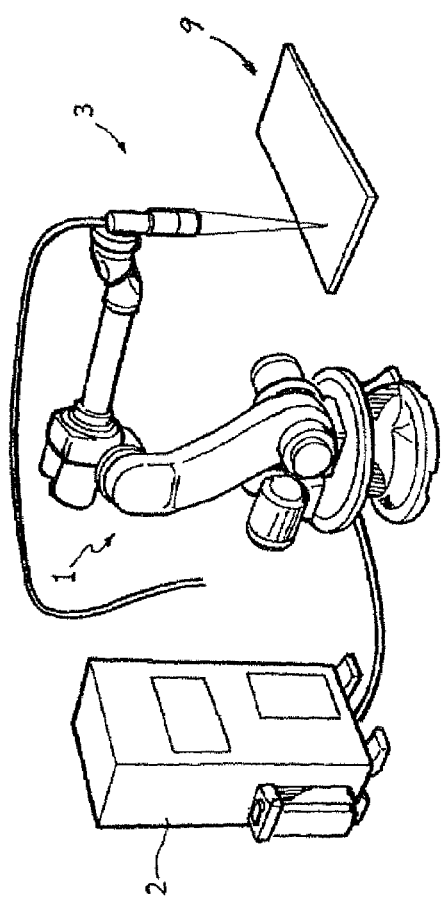
FIG. 1 is a perspective view of a handling robot equipped with a device according to the present invention.

In FIG. 1 number 1 globally refers to a handling robot of any known type. The Applicant has been manufacturing and marketing for a long time handling robots of "anthropomorphous" type using a series of elements turnably mounted or articulated one with respect to the other according to a respective series of axes (typically six). Each of said axes is associated to an electric control motor. Electric motors are controlled by a control unit 2 connected to the robot. The unit 2 can control the electric motors so as to shift spatially the articulated robot structure bringing the final end of the robot, or "wrist", to any point in a spatial volume having given shape and size.

In the case of the invention, an accessory device 3 is mounted onto the robot wrist, which device includes a focusing head 4 for focusing into a welding spot or area W a laser beam coming from a laser source (not shown in the drawing) and guided through an optical fiber bundle 5 to the device 3. In FIG. 1 the optical fiber bundle 5 is arranged outside the robot structure. However, the optical fiber bundle can be placed at least partly inside the robot structure, as envisaged and suggested in previous patent applications belonging to the same Applicant.

With reference to FIG. 1, the device 3 has a simplified structure including a base portion 6 designed to be connected stiffly to the robot wrist, and a portion 7 containing the focusing head 4, which rests onto portion 6 oscillating around one axis 8. The base frame 6 is also equipped with motors of any known type for controlling the oscillation of the frame 7 carrying the focusing head 4 around axis 8. Said motors are controlled by a separate control unit communicating with robot control unit 2 or they can also be controlled by electronic means integrated into robot control unit 2, in order to ensure a control of the device according to the requirements specified below.

In FIG. 1 number 9 globally refers to a structure to be welded, for instance a pair of pressed metal sheets, designed to be joined one to the other along their perimeter by applying a series of weld beads. An example of such applications is the welding of the structure of a motor-vehicle door. The invention can however be used also outside the automotive field.

Figure 2:
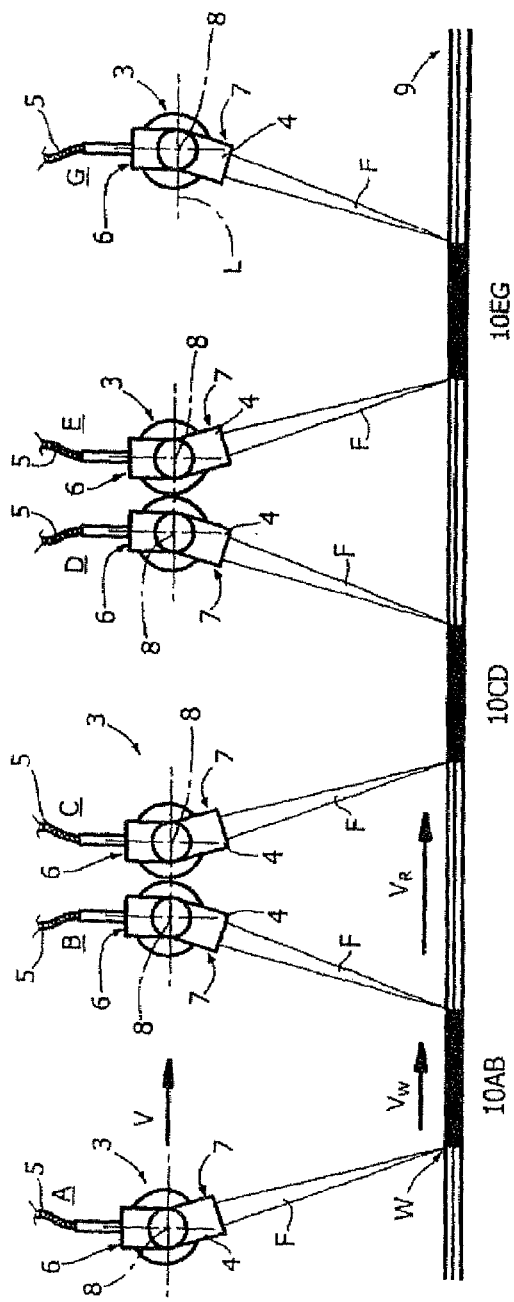
FIG. 2 is a schematic view showing the various positions held by the device according to the invention during a welding process.

FIG. 2 shows the various positions held by the device 3 during a welding process in which a plurality of weld beads 10 is carried out, which beads are lined up and at a given longitudinal distance.

During the process the robot 1 is controlled so as to shift the device 3 along a trajectory L and with a speed V which is as a rule higher than the speed at which each weld bead 10 should be created. While the robot shifts the device 3 along the rectilinear trajectory L at speed V, the control device varies the direction of the focused beam F so that the area W lighted by the beam F shifts along the structure 9 at a speed $V_W$ corresponding to the speed at which the weld bead should be created. This means that during the shift of the device 3 along the trajectory L (to the right with reference to FIG. 2), the direction of the focused beam F is oscillated clockwise (still referring to FIG. 2), so that the focused beam F creates the weld bead 10AB, while the device 3 shifts from position A to position B in FIG. 2.

Once it has completed the weld bead 10AB, the focused beam F is oscillated abruptly so as to be brought on the initial end of the new bead 10CD, while the device 3 has reached position C. Said abrupt oscillation results in that the piece area lighted by the beam F shifts at a very high speed $V_r$ from the final end of bead 10AB to the initial end of bead 10CD. Again, the weld bead 10CD is carried out with robot 1, which shifts the device 3 at a speed V higher than the speed at which the lighted area of the piece shifts along said piece so as to create the bead 10CD. When the device 3 reaches position D, the focused beam F has reached the final end of the seam 10CD and it is ready to oscillate abruptly to the initial position of bead 10EG, corresponding to position E of the device 3. Now a new weld bead 10EG is carried out as described above. When the focused beam F comes close to the final end of the bead 10EG, the device 3 is in position G, whereas the focused beam is again rotated clockwise from the direction it had in position B to the direction it holds in position G.

As can be seen, the method and device described above exploit the basic principle of remote laser welding though greatly simplifying the structure for its implementation thanks to the fact that the robot can be of any type and to it is adapted the extremely simplified focusing and pointing device, which has one control axis 8.

Obviously, the device 3 can comprise both means enabling the oscillation around axis 8 of the structure carrying the focusing head 4, and alternatively optical means, for instance an oscillating mirror, enabling the oscillation of the pointing direction of the focused beam F without oscillating the corresponding support structure.

Obviously, though the basic idea of the invention remains the same, construction details and embodiments can widely vary with respect to what has been described and shown by mere way of example, however without leaving the framework of the present invention.

In particular, though the example shown in the accompanying drawings includes an orientation device for the focused beam F comprising one oscillation axis 8, the invention further includes the case of a device in which, in addition to said oscillation axis, one or more additional axes are present.

What is claimed is:

1. A method for laser welding for use with a structure consisting of metal sheet elements comprising:
    providing a multi-axis handling robot including a plurality of electric motors controlling the movement of elements of the robot around said axes, together with a programmable electronic control unit for controlling said electric motors in order to shift a terminal element of the robot in any position, with any orientation and on any trajectory inside a given three-dimensional spatial volume;
    mounting onto said terminal element of the handling robot an accessory device for focusing a laser beam coming from a laser source, said accessory device being designed to orient the focused laser beam by oscillating it around one single oscillation axis;
    controlling said handling robot so as to shift the aforesaid accessory device at a selected first speed which is higher than a selected second speed at which at least two welding beads are to be created along a rectilinear trajectory parallel to a direction along which the at least two welding beads are to be positioned orthogonal to said single oscillation axis;
    wherein while the aforesaid accessory device is shifted by said handling robot along said rectilinear trajectory at the first speed, oscillating the direction of the focused laser beam around said single oscillating axis by means of said accessory device, in order to shift the area of the structure to be welded that is locally illuminated by the focused laser beam along a trajectory at the second speed; and
    on completion of one of the at least two weld beads at a first weld bead end, abruptly oscillating the focused laser beam about the oscillating axis from the first bead end to a start end of a second weld bead at a third speed greater than the second speed while the accessory device continues moving at the first speed.

2. The method according to claim 1, wherein said accessory device comprises a base portion stiffly connected to a robot wrist, and a frame resting in an oscillating way onto said base portion around said one oscillation axis, motors being provided for controlling said oscillation.

3. The method according to claim 2, wherein said oscillating frame supports a focusing head for the laser beam.

4. The method according to claim 2, further comprising a focusing head connected to the base portion and optical means oscillating inside the focusing head, so as to oscillate the focused laser beam.

5. The method according to claim 2, wherein the laser beam is guided from the laser source to the accessory device through an optical fiber bundle.

6. The method according to claim 5, wherein the optical fiber bundle is wholly arranged outside the robot structure.

7. The method according to claim 5, wherein the optical fiber bundle is at least partly arranged inside the robot structure.

* * * * *